United States Patent
Buening et al.

(10) Patent No.: US 10,023,762 B2
(45) Date of Patent: Jul. 17, 2018

(54) EPOXY RESIN-BASED GEL COAT FOR SURFACE FINISHING OF COMPONENTS MADE OF FIBRE-REINFORCED PLASTICS

(71) Applicant: MANKIEWICZ GEBR. & CO GMBH & CO. KG, Hamburg (DE)

(72) Inventors: Jens Buening, Reppenstedt (DE); Jochen Wehner, Hamburg (DE)

(73) Assignee: MANKIEWICZ GEBR. & CO GMBH & CO. KG, Hamburg (DE)

( * ) Notice: Subject to any disclaimer, the term of this patent is extended or adjusted under 35 U.S.C. 154(b) by 622 days.

(21) Appl. No.: 14/402,314

(22) PCT Filed: May 21, 2013

(86) PCT No.: PCT/DE2013/000272
§ 371 (c)(1),
(2) Date: Nov. 20, 2014

(87) PCT Pub. No.: WO2013/174362
PCT Pub. Date: Nov. 28, 2013

(65) Prior Publication Data
US 2015/0093582 A1    Apr. 2, 2015

(30) Foreign Application Priority Data
May 21, 2012 (DE) .................. 10 2012 010 583

(51) Int. Cl.
C08L 63/00 (2006.01)
C09D 163/00 (2006.01)
C08J 7/04 (2006.01)
B32B 37/15 (2006.01)
F03D 1/06 (2006.01)

(52) U.S. Cl.
CPC ............ *C09D 163/00* (2013.01); *B32B 37/15* (2013.01); *C08J 7/047* (2013.01); *C08L 63/00* (2013.01); *F03D 1/0675* (2013.01); *C08J 2363/00* (2013.01); *C08J 2475/04* (2013.01); *Y02E 10/721* (2013.01); *Y10T 428/31511* (2015.04)

(58) Field of Classification Search
CPC .... C08J 7/047; C08J 2363/00; C08J 2475/04; C09D 163/00; C08L 63/00; B32B 37/15; F03D 1/0675; Y10T 428/31511; Y02E 10/721
USPC ........................................................ 523/404
See application file for complete search history.

(56) References Cited

U.S. PATENT DOCUMENTS

| | | | |
|---|---|---|---|
| 4,847,319 A * | 7/1989 | Bandlish | C08G 18/10 524/188 |
| 5,087,688 A | 2/1992 | Gruber et al. | |
| 5,153,296 A * | 10/1992 | Gras | C08G 18/10 524/102 |
| 5,219,975 A | 6/1993 | Schmalstieg et al. | |
| 5,459,180 A | 10/1995 | Pfeil et al. | |
| 5,510,432 A | 4/1996 | Schmalstieg et al. | |
| 5,958,593 A | 9/1999 | Shomer | |
| 5,959,061 A | 9/1999 | Neumann et al. | |
| 6,136,398 A * | 10/2000 | Willett | C08L 23/08 428/41.3 |
| 6,562,884 B1 | 5/2003 | Tang et al. | |
| 2003/0130481 A1 | 7/2003 | Whiter | |
| 2006/0287463 A1 | 12/2006 | Wehner | |
| 2008/0255271 A1 | 10/2008 | Raymond | |
| 2008/0319105 A1 | 12/2008 | Lutz et al. | |
| 2009/0294057 A1* | 12/2009 | Liang | C09J 151/04 156/330 |
| 2011/0045723 A1 | 2/2011 | Nowak et al. | |
| 2011/0126980 A1* | 6/2011 | Campbell | C09J 163/00 156/330 |

FOREIGN PATENT DOCUMENTS

| | | |
|---|---|---|
| CN | 101679579 A | 3/2010 |
| DE | 43 10 198 A1 | 10/1994 |
| DE | 196 30 277 A1 | 1/1998 |
| DE | 198 48 113 A1 | 4/2000 |
| DE | 103 44 380 A1 | 5/2005 |
| EP | 0 406 166 A2 | 1/1991 |
| EP | 0 457 089 A2 | 11/1991 |
| EP | 0 688 803 A1 | 12/1995 |
| EP | 0 697 426 A1 | 2/1996 |
| EP | 1 319 677 A1 | 6/2003 |
| KR | 10-2008-0092259 A | 10/2008 |
| WO | WO 00/55234 A1 | 9/2000 |

(Continued)

OTHER PUBLICATIONS

LyondellBasell Industries Holdings, B.V., "Technical Data, Polymeg® Polyols, Petetramethylene ether glycol (PTMEG)", 2011.*
Invista, "Product Data Sheet, Terathane PTMEG", 2016.*
DIN EN ISO 2814: "Paints and varnishes—Comparison of contrast ratio (hiding power) of paints of the same type and colour", English Version, pp. 1-4 (2006).
DIN EN ISO 1519: "Paints and varnishes—Bend test (cylindrical mandrel)", English translation, pp. 1-17 (2011).
DIN EN ISO 13937-2: "Textiles—Tear properties of fabrics—Part 2: Determination of tear force of trouser-shaped test specimens (Single tear method)", English version, pp. 1-18 (2000).

(Continued)

*Primary Examiner* — David T Karst
(74) *Attorney, Agent, or Firm* — Norman B. Thot

(57) ABSTRACT

A composition for the manufacture of a gelcoat includes a main component and a curing component. The main component comprises at least one epoxide resin selected from the group consisting of glycidyl ethers of bisphenol A, glycidyl ethers of bisphenol F, trimethylolpropane triglycidyl ethers, and mixtures thereof, and up to 5 wt.-% of at least one of a filler and a pigment based on a total weight of the main component. The curing component comprises at least one cycloaliphatic amine. The main component or the curing component further comprises at least one polytetrahydrofurane polyol.

17 Claims, No Drawings

(56) References Cited

FOREIGN PATENT DOCUMENTS

WO     WO 03/078534 A1    9/2003
WO     WO 2005/030825 A2    4/2005
WO     WO 2009/141215 A1    11/2009

OTHER PUBLICATIONS

DIN EN ISO 4624: "Paints, varnishes and plastics—Pull-off test for adhesion", English version, pp. 1-15 (2003).
DIN 53150: "Paints and varnishes—Determination of the drying stage of coatings (modified Bandow-Wolff method)", Withdrawn and substituted by DIN EN ISO 9117-5, pp. 1-7 (2002).
DIN EN ISO 9117-5: "Paints and varnishes—Drying tests—Part 5: Modified Bandow-Wolff test", English version, pp. 1-13 (2012).
T. Jiading et al.: "Effect of amine curing agents on curing behavior of epoxy resin and properties of cured compounds", Chemistry Journal, vol. 62, No. 6, English Abstract of pp. 1723-1729 (2011).

* cited by examiner

EPOXY RESIN-BASED GEL COAT FOR SURFACE FINISHING OF COMPONENTS MADE OF FIBRE-REINFORCED PLASTICS

CROSS REFERENCE TO PRIOR APPLICATIONS

This application is a U.S. National Phase application under 35 U.S.C. § 371 of International Application No. PCT/DE2013/000272, filed on May 21, 2013 and which claims benefit to German Patent Application No. 10 2012 010 583.5, filed on May 21, 2012. The International Application was published in German on Nov. 28, 2013 as WO 2013/174362 A1 under PCT Article 21(2).

FIELD

The present invention relates to compositions based on epoxy resins for the production of gelcoats and the use of said gelcoats for the surface treatment of fiber reinforced plastics. The present invention also relates to processes for the production of the gelcoats, as well as to processes for the manufacture of surface treated components made of fiber reinforced plastics, in particular to manufacturing processes that employ prepegs.

BACKGROUND

Surfaces of laminates or components composed of fibers such as glass fibers, carbon fibers, or plastic fibers in a matrix of curable resins such as epoxy resins, unsaturated polyester resins, or vinyl ester resins generally feature less acceptable surfaces, which, moreover, are not resistant to light and weathering. These must first be treated with protective coatings if these components are to be employed in applications for which decorative or weather-resistant surfaces are required.

Components' surfaces are as a rule painted with suitable coating materials, predominantly weather-resistant and anti-corrosive paints, for example, those based on aliphatic polyurethanes. To ensure sufficient adhesion of the coating to the component, the surfaces to be painted must, however, first undergo complex pretreatment. Surfaces ready for painting are usually obtained following a number of process steps. The surface of the demolded component is first sanded to effect a complete removal of any mold releasing agents. The surface is then coated or smoothed with a filling compound to level out any surface defects such as pores or individual protruding fibers exposed by the sanding treatment. Once the filling compound has hardened, the surface is again sanded to obtain a smooth surface ready for painting.

One alternative to this time-consuming and laborious pretreatment process is the application of a gelcoat. A gelcoat is a composition based on a resin system and is applied to the surfaces of components using an in-mold composite construction process. The use of gelcoats yields smooth surfaces during the manufacturing process of the component, which surfaces are ideal for sanding. The surfaces may then be painted immediately following sanding. The gelcoat is generally placed in a component mold as the first layer, which is then pre-cured or incipiently gellated to an extent at which the dryness grade 6 in accordance with DIN 53 150 has been reached, at which it complies with the mechanical requirements for subsequent processing. Fibers, for example, in the form of woven fabrics, non-woven fabrics, or laid webs, and the laminating resin containing the thermosetting resin employed as a matrix are then placed on the partially gellated gelcoat film. The entire composition is then hardened to completion. The gelcoat film must be sufficiently stable that the fibers can be applied, and where necessary removed again, without damaging the film. In the case of extremely large molds, such as rotor blades for wind turbines, woven fabrics or non-woven fabrics are usually applied by hand. It must consequently also be possible to walk on the gelcoat film without the film sustaining damage.

Use has until now been made of filled gelcoats. The filler distributed in the resin system forms a framework which provides the required mechanical stability with only minimal precuring or only after minimal progression of the curing reaction of the gelcoat. The use of transparent gelcoats is more advantageous since laminating flaws, such as gas bubbles or dry areas in the laminate which have not been coated by resin, can be readily detected and repaired following removal of the component from the mold. Transparent gelcoats not containing filler require a much more intense curing process to 0 achieve the required stability of the film. More intense progression of the curing reaction, however, results in considerably shorter laminating times. The laminating time is taken to be the amount of time occurring between the point in time at which the gelcoat placed in the mold becomes tack-free and the point in time at which the gelcoat film must be sufficiently laminated to provide adhesion between the gelcoat and the laminate.

For these reasons, transparent gelcoats are as yet only employed for the production of laminates using liquid laminating resins. In prepreg procedures, the mechanical stability of the gelcoat film must be considerably higher since the tackiness of the prepreg impedes handling and, in particular, application thereof on the gelcoat film. It is not generally possible to adjust positioning since the film will tear upon removal of the prepreg from the gelcoat film, or the entire composition might even be wrenched out of the mold. If the gelcoat film is subjected to more intense curing to attain greater stability, however, the laminating time will be insufficient for the formation of laminate layers, particularly in relatively large molds.

SUMMARY

An aspect of the present invention is to provide improved materials and procedures to allow for the use of transparent gelcoats, in particular in prepreg procedures, whilst retaining the known advantages thereof.

In an embodiment, the present invention provides a composition for the manufacture of a gelcoat which includes a main component and a curing component. The main component comprises at least one epoxide resin selected from the group consisting of glycidyl ethers of bisphenol A, glycidyl ethers of bisphenol F, trimethylolpropane triglycidyl ethers, and mixtures thereof, and up to 5 wt.-% of at least one of a filler and a pigment based on a total weight of the main component. The curing component comprises at least one cycloaliphatic amine. The main component or the curing component further comprises at least one polytetrahydrofurane polyol.

DETAILED DESCRIPTION

The compositions of the present invention for the production of a gelcoat contain a main component which contains at least one or more epoxy resins, and a curing component which contains one or more amines. Unlike the conventional gelcoat resin systems based on radically curing resins, such as unsaturated polyesters (UP), vinyl esters, or acrylate-terminated oligomers, the epoxy resin-based gelcoats according to the present invention do not indicate any monomeric emissions. They also show only minimal shrinkage during curing, or no shrinkage at all, and thus avoid stresses in the composite material or gelcoat boundary surface so as to provide a stable boundary surface. Epoxy resin-based composite materials (EP) moreover demonstrate excellent adhesion to the gelcoats of the present invention.

Epoxy resins suitable for use in the present invention are aromatic glycidyl compounds such as glycidyl ethers of bisphenol A, glycidyl ethers of bisphenol F, phenol novolak glycidyl ethers, cresol novolak glycidyl ethers, glyoxal tetraphenol tetraglycidyl ethers, p-tert. butylphenol glycidyl ethers, cresyl glycidyl ethers, N,N-diglycidyl aniline, p-aminophenol triglycid, tetraglycid-4,4'-methylene dianiline, cycloaliphatic glycidyl compounds such as methyl tetra hydro phthalic diglycidyl ether, hexahydrophthalic diglycidyl ether, cyclohexane dimethanol diglycidyl ether, glycidyl ethers of hydrated bisphenol A and glycidyl ethers of hydrated bisphenol F, epoxidated cycloolefins, aliphatic glycidyl ethers such as trimethylolpropane triglycidyl ether, the diglycidyl ethers of 1,6-hexane diol and 1,4-butane diol, n-dodecyl glycidyl ether, n-tetradecyl glycidyl ether, as well as glycidyl ethers of polyoxyethylene polyols. Low-viscosity and medium-viscosity fluid epoxy resin types, semi-solid and solid epoxy resin types as well as combinations thereof may also be used. In accordance with the present invention, the use of glycidyl ethers of bisphenol A, glycidyl ethers of bisphenol F, trimethylol propane triglycidyl ethers and combinations thereof can, for example, be used. Epoxy resins are used in quantities of from 40 to 90%, for example, between 60 and 80%, and, for example, between 65 and 75% by weight, based on the main component.

The composition furthermore contains one or more polyols. The polyols may be present in the main component as well as in the curing component. In accordance with the present invention, the polyols can, for example, be used in the main component. Suitable polyols include polyacrylate polyols, polyester polyols, polyether polyols, polycarbonate polyols, polycaprolactones, and polyurethane polyols. The average molecular weights based on the number average of polyols can, for example, be 1000 to 3000 g/mol, for example, between 1500 and 2500 g/mol, and, for example, between 1800 and 2000 g/mol. The polyols are applied in amounts of from 2 to 40%, for example, between 5 and 30%, and, for example, between 10 and 20%, by weight of polyols, based on the main component including the polyols. Polytetrahydrofuran polyols can, for example, be used.

In order to facilitate application of the transparent gelcoat, fillers and/or pigments may be added in small amounts. The fillers are considered below to be particulate substances virtually insoluble in the application medium and are used in order to influence the optical characteristics. They may moreover also be conducive to increasing volume in order to achieve or improve technical properties. The term pigments relates below to substances that are virtually insoluble in the application medium and that are applied as chromophoric substances or dyes. The compositions of the present invention are very slightly dulled with fillers and/or pigments to facilitate management thereof to the effect that material which has already been applied is more readily discernible during the application process. In this regard, the content of fillers and/or pigments in the main component of the compositions of the present invention can, for example, be not more than 5%, for example, not more than 2%, for example, not more than 1%, and, for example, not more than 0.5%, by weight of the main component. The composition will become non-transparent if greater quantities are added. Suitable fillers and pigments include mineral materials such as kaolin or talcum, synthetic materials such as barium sulphate or calcium carbonate, and also inorganic or organic pigments as used conventionally in paint production, and combinations thereof. Titanium dioxide or soot can, for example, be used in accordance with the present invention.

In an embodiment of the present invention, the curing component can, for example, contain one or more amines. Suitable amines include polyamines selected from the group consisting of polyethylene polyamines such as ethylene diamine, diethylene triamine, triethylene tetramine, tetraethylene pentamine, pentaethylene hexamine, pentane-1,3-diamine, 2-methyl pentamethylene diamine, propylene amines such as propylene diamine, dipropylene triamine, dimethylaminopropylamine, trimethyl hexamethylene diamine, polyether polyamines such as polyoxypropylene diamines or polyoxypropylene triamines, polyoxypropylene polyamines, polyoxyethylene polyamines, polytetrahydrofuran polyamines, or butanedioether diamines or N-aminopropyl cyclohexyl amine, alkylene diamines such as hexamethylene diamine, trimethylhexamethylene diamine, or methyl pentamethylene diamine, cycloaliphatic amines such as tricyclododecane diamine, N-aminoethyl piperazine, isophorone diamine, or diaminocyclohexane, aromatic amines such as diaminodiphenylmethane or diaminodiphenylsulfone, araliphatic amines such as m-xylylene diamine and modifications thereof, for example, polyaminoamides, Mannich bases and epoxy adducts, as well as combinations thereof. Cycloaliphatic amines, and in particular isophorone diamine, can, for example, be used. The amines are added in quantities of from 60 to 100%, for example, between 80 and 95%, and, for example, between 85 and 95% by weight of the curing component.

The curing components of the present invention may additionally include accelerants. Suitable accelerants are tertiary amines such as N,N-dimethyl aniline or dimethyl benzylamine, alkoxides, imidazoles, Mannich bases such as (dimethyl aminomethyl)phenol or tris(dimethyl aminomethyl)phenol, boron trifluoride complexes, Broensted acids, alkyl phenols, polyphenols, onium salts, triarylsulfonium salts, iron arene complexes or salts of alkali metals or of alkaline earth metals such as lithium bromide or calcium nitrate. Accelerants can, for example, include phenols, polyphenols, alkali metal salts or alkaline earth metal salts. Calcium nitrate tetrahydrate can, for example, be added. The accelerator is added in quantities of from 0.2 to 40%, for example, from 0.5 to 20%, and, for example, from 1 to 10% by weight of the curing component.

The composition contains plasticisers. Suitable plasticisers are polyurethane prepolymers having blocked isocyanate groups. The plasticisers can be present in the main component as well as in the curing component. Isocyanate prepolymers blocked with substituted phenols and/or pyrazoles can, for example, be added in the main component as described in EP 0688803 A1, the disclosure of which is incorporated by reference herein. Linear polymers having terminal isocyanate groups blocked with alkylphenol groups can, for example, be used. If the plasticisers are added to the curing component, isocyanate prepolymers in which the isocyanate groups are blocked with secondary monoamines, as described in EP 0457089 A2, can, for example, be used. The disclosure of EP 0457089 A2 is incorporated by reference herein.

The compositions according to the present invention may further contain conventional additives as commonly used by the person skilled in the art. Rheology modifiers such as fumed silica, flow control agents or defoamers, for example, may thus be used in the usual quantities.

In accordance with the present invention, the use of epoxy resins and amines can, for example, be used in the molar ratio of epoxy groups to N—H-groups reactive to epoxy groups (EP:N—H) of from 1 to 0.7 to 1 to 1.4, for example, from 1 to 0.8 to 1 to 1.3, and, for example, from 1 to 0.9 to 1 to 1.2.

The gelcoats which can be produced from the compositions according to the present invention are transparent, that is to say, they exhibit a poor hiding power. The hiding power of the gelcoat according to the present invention is defined in DIN EN ISO 2814 on a checkered card. The hiding power measured thereby can only be ascertained at a film thickness of more than 1 mm. The film thickness of an applied gelcoat is considerably less and usually measures approx. 500 μm.

The gelcoats according to the present invention show relatively short gellation times. Due to these short gellation times, the hold time for the mold is reduced considerably, allowing for shorter mold hold cycles. The materials are tenacious and not brittle in the form of a gelcoat film in an insidiously gellated state. A comparison with regular transparent gelcoats shows considerably superior elongation at break and tear propagation strength in the case of the gelcoat according to the present invention. Repositioning of applied prepregs according to the present invention without causing damage thereto is also possible when using the gelcoat films.

Despite their transparency, the gelcoats according to the present invention exhibit the mechanical stability required for subsequent processing stages. They in particular also fulfill the requirements for the manufacture of laminates or fiber plastic composite components in the prepreg process. As with the conventional, filled gelcoats, they also exhibit excellent adhesion to the laminate, are easily sanded in a cured state, and are suitable for the application of paint thereon.

The present invention also provides the use of the gelcoat according to the present invention for the surface treatment of fiber plastic composite components or laminates. The gelcoat can, for example, be applied to surfaces of the component using the in-mold method. The gelcoat film is placed in the component mold as a first layer to this end. The composition according to the present invention is first added to a mold following mixing of its reaction components, the main component and the curing component, within the pot life. The pot life is the period during which the mix remains workable. It begins at the point in time at which the two reaction components are mixed and ends at the point in time at which the viscosity of the reaction mixture has risen to such an extent that it is possible to apply a layer that is even in thickness. The layer obtained following gellation is sufficiently mechanically stable that it does not sustain damage upon application of the laminating resin and the fibers, but is sufficiently reactive to create a stable bond when the laminating resin cures. Examples of the laminating resins used are epoxy resins, unsaturated polyester resins, and vinyl ester resins. Examples of the fibers used are woven fabrics, laid webs, and non-woven fabrics of glass, carbon, or plastic fibers. To provide sufficient adhesion between laminating resin and gelcoat, the gelcoat layer must be brought into contact with the laminating resin within the laminating period of the gelcoat. The laminating resin and gelcoat will then harden to completion.

The gelcoats according to the present invention can, for example, be used for the surface treatment of epoxy resin composite materials because they exhibit better adhesion to these materials than gelcoat based on other resinous systems. They also do not contain any volatile monomers and are therefore less encumbering with regard to industrial hygiene.

The present invention also provides a method for manufacturing surface-treated fiber plastic composite components or laminates. Firstly, the required two components, the main component and the curing component, are mixed with the composition of the present invention. The mixture is transferred to the component mold as a first layer using the application method conventionally applied by the expert, for example, by painting, rolling, spraying, or pouring. The applied mixture is then gellated or pre-cured to form a gelcoat film. Fibers in the form of woven fabrics, laid webs, or non-woven fabrics, as well as the laminating resin are then applied to the gelcoat film. In the next stage, the entire composite mixture is hardened to form the desired component. The component is then removed from the mold and its surface is subsequently sanded and then painted.

Fibers and laminating resins can be applied to the gelcoat film by various methods. Usual laminating methods, such as the vacuum bag method, the injection method, the infusion method, and the wet laminating method are known to the person skilled in the art. One way of producing the fiber composite material involves the use of prepregs. Prepregs are impregnated resin/fiber mats which are placed in the component mold. The resin is partially pre-cured and exhibits relatively strong adhesion properties at room temperature. One problem incurred by the use of prepregs is that of repositioning on the gelcoat film. Component molds are generally pretreated with a mold release agent to ensure that the gelcoat film itself will not stick to the mold. When adhesive prepreg is applied to the gelcoat and then removed therefrom, the gelcoat should not tear or break. Since there is no adhesiveness relatively to the mold, the gelcoat film must accordingly be mechanically stable. The gelcoats according to the present invention form films which exhibit the required mechanical properties, and can therefore be used in prepreg methods. The compositions of the present invention also require only short gellation times. Since the curing process is considerably quicker in the prepreg method than in other methods, they are particularly suitable for use in these methods also for this reason.

Examples of gelcoat compositions according to the present invention are examined below to compare the properties of the gelcoats according to the present invention with those of commercially-used transparent gelcoats.

TABLE 1a

Composition of Main Component

| Substance | Content in parts by weight | | |
|---|---|---|---|
| | S1 | S2 | S3 |
| Bisphenol A diglycidyl ether | 25 | 25 | 25 |
| Bisphenol F diglycidyl ether | 10 | 10 | 10 |
| Trimethylol propane triglycidyl ether | 40 | 47 | 40 |
| Polytetramethylene oxide polyol | 12 | — | — |
| Polypropylene oxide polyol | — | 15 | 12 |
| Plasticiser | 10 | — | 10 |
| Fumed silica | 2.99 | 3 | 2.99 |
| Titanium oxide | 0.01 | — | 0.01 |

TABLE 1b

Composition of Curing Component

| Substance | Content in parts by weight | |
|---|---|---|
| | HA | HB |
| Isophorone diamine | 65 | 92 |
| Phenolic accelerator | 35 | — |
| Calcium nitrate tetrahydrate | — | 4 |
| Propandiol | — | 4 |

TABLE 1c

Composition of Gelcoat

| Example No. | Main component | Curing component | Molar proportion MP |
|---|---|---|---|
| 1.1 | S1 | HB | 1.09 |
| 1.2 | S1 | HA | 1.13 |
| 1.3 | S2 | HB | 0.87 |
| 1.4 | S3 | HA | 1.07 |
| 2.1 | Commercially available transparent gelcoat | | |
| 2.2 | Commercially available transparent gelcoat | | |

The following tests for elongation at break properties, tear propagation resistance, and prepreg re-position ability were performed on gelcoat films gellated under various curing conditions.

The elongation at break was determined via a mandrel bending test in accordance with the test specification set forth in DIN EN ISO 1519. Metal plates, to which the coating under test were applied, were bent around a mandrel. The smaller the radius of the mandrel around which the plate could be bent without damaging or fracturing the coating, the greater the elongation at break of the coating.

The tear propagation resistance was determined via tear propagation tests in accordance with test specification set forth in DIN EN ISO 13937-2. The force necessary to enlarge a crack in the coating undergoing examination was measured. The greater the applied force, the more tear-resistant the coating.

The prepreg repositioning was determined via the following test set-up which simulates a laminate structure in a component mold. A mold release agent was applied to a sufficiently large metal plate. A gelcoat composition was then coated over an area of 1 m² on the prepared plate. The composition was gellated on the gelcoat film at the prescribed temperature and for the prescribed duration. A prepreg of dimensions DIN A4 was laid centrally on the gelcoat film and pressed down firmly with a defined force for 1 minute. The prepreg was then removed swiftly at an angle of 90°. Visible damage to the gelcoat film was rated as follows:

++ No changes
+ Detachment of the gelcoat film from the metal plate at up to three positions without damaging the gelcoat film itself
0 Detachment at up to 10 positions with damage at a maximum of three positions
− Increased damage of the gelcoat film
−− Total detachment of the gelcoat film from the metal plate Tables 2a and 2b show the results of the tests on gelcoat films gellated under various conditions. The gelcoats according to the present invention show considerably improved values in relation to elongation at break and tear growth resistance. In contrast to commercially available gelcoats, the removal of a prepreg applied under pressure did not cause any damage to the gelcoat according to the present invention. It may thus be applied in processes involving prepregs without incurring the usual disadvantages.

TABLE 2a

Properties of the gelcoat film gellated at 60° C.
(Temperature was maintained until a dryness grade of 6 according to DIN 53 150 was reached.)

| | Gelcoat no. | | | | | |
|---|---|---|---|---|---|---|
| | 1.1 | 1.2 | 1.3 | 1.4 | 2.1 | 2.2 |
| Elongation at break | | | | | | |
| Mandrel diameter in [mm] without fracture | 40 | 25 | 8 | 12 | 1) | 1) |
| Mandrel diameter in [mm] with fracture | 25 | 20 | 6 | 8 | 220 | 220 |
| Tear growth resistance | | | | | | |
| Force in [N/mm] | 3.7 | 1.1 | 0.5 | 2.8 | 2) | 2) |
| Prepreg repositioning ability | | | | | | |
| Damage assessment | ++ | ++ | + | ++ | −− | −− |

1) Value was not determined
2) Value not measurable due to splintering of the coating TABLE 2b Properties of the Gelcoat Film Gellated at 23° C.
(Temperature was maintained for 18 hours.)

| | Gelcoat no. | | | | | |
|---|---|---|---|---|---|---|
| | 1.1 | 1.2. | 1.3 | 1.4 | 2.1 | 2.2 |
| Elongation at break | | | | | | |
| Mandrel diameter in [mm] without fracture | 40 | 55 | 40 | 25 | 1) | 1) |
| Mandrel diameter in [mm] with fracture | 32 | 40 | 32 | 32 | 220 | 220 |
| Tear growth resistance | | | | | | |
| Force in [N/mm] | 4.3 | 4.5 | 0.3 | 2.1 | 2) | 2) |
| Prepreg repositioning ability | | | | | | |
| Damage assessment | ++ | ++ | + | ++ | −− | −− |

1) Value was not determined
2) Value not measurable due to splintering of the coating The following tests for adhesion of the laminate to the gelcoat, for sandability, and for paintability were performed on the cured laminates. The gelcoat compositions were placed in a mold and gellated, the prepreg was then applied to the gelcoat film. The mold was sealed and a vacuum bag attached and evacuated. The entire composition was then cured, the curing conditions being prescribed by the respective prepreg used. The following tests were performed on the cured laminates.

The elongation at break was determined using the aforementioned mandrel bending test. Metal strips were coated in gelcoat as described above, the gelcoat being gellated and cured under the same temperature conditions as those applied for curing of the prepreg laminates. The smaller the mandrel diameter, the greater the elongation at break. The adhesive strength of the gelcoat on the laminate was determined by means of pull-off tests in accordance with test specification set forth in DIN EN ISO 4624. The greater the force required to pull off the seal, the stronger the adhesion.

In order to assess the laminate surfaces treated with gelcoat, their sandability, i.e., their abrasion resistance, and their paintability, i.e., the adhesion of paint coats on their surfaces, were determined. The resistance to abrasion was determined gravimetrically in accordance with test specification set forth in ASTM D 4060 using a S33 wheel rotating at 500 rpm under a load of 1000 g. The greater the difference in weight, the higher the abrasion resistance and, consequently, the better the sandability.

For the purpose of assessing the paintability, the laminate surfaces were first sanded with grade 180 sandpaper. The sanding dust was then removed from the surface, which was then painted with a suitable commercially available paint. On completion of curing of the paint film, the adhesion thereof, i.e., its adhesive strength, was determined by means of stripping tests in accordance with test specification set forth in DIN EN ISO 4624. The greater the tension required to pull off the film, the stronger the adhesion.

Table 3 shows the results on the surface-treated laminate according to the present invention compared with regular surface-treated laminates. The laminates according to the present invention also fulfill, as in the case of the regular laminates, all requirements with regard to adhesion, sandability, and paintability.

TABLE 3

Properties of the Cured Laminates

| | Gelcoat no. | | | | | |
|---|---|---|---|---|---|---|
| | 1.1 | 1.2. | 1.3 | 1.4 | 2.1 | 2.2 |
| Elongation at break | | | | | | |
| Mandrel diameter in [mm] with no fracture | 70 | 70 | 85 | 70 | 70 | 85 |
| Mandrel diameter in [mm] with fracture | 55 | 55 | 70 | 55 | 55 | 70 |
| Adhesion of gelcoat to laminate | | | | | | |
| Stripping tension in [N/mm$^2$] | 9.1 | 9.8 | 8.7 | 9.2 | 8.9 | 8.8 |
| Taber abrasion | | | | | | |
| Difference in [mg] | 986 | 864 | 793 | 891 | 762 | 1) |
| Adhesion paint on gelcoat | | | | | | |
| Stripping tension in [N/mm$^2$] | 6.3 | 5.3 | 6.1 | 5.9 | 6.6 | 4.4 |

1) Not determined

The present invention is not limited to embodiments described herein; reference should be had to the appended claims.

What is claimed is:

1. A composition for the manufacture of a gelcoat, the composition consisting of:
   a main component consisting of,
     at least one epoxide resin selected from the group consisting of glycidyl ethers of bisphenol A, glycidyl ethers of bisphenol F, trimethylolpropane triglycidyl ethers, and mixtures thereof,
     up to 5 wt.-% of at least one of a filler and a pigment based on a total weight of the main component, and
     optionally at least one polytetrahydrofuran polyol;
   a curing component consisting of,
     at least one cycloaliphatic amine,
     up to 40 wt.-% of at least one accelerant based on a total weight of the curing component, and
     optionally at least one polytetrahydrofuran polyol;
   up to 10 wt.-% of at least one plasticizer based on a total weight of the main component; and
   0 to 3 wt.-% of at least one additive selected from a rheology modifier, a flow control agent, and a defoamer based on a total weight of the main component,
   wherein, the main component or the curing component must include the at least one polytetrahydrofuran polyol.

2. The composition as recited in claim 1, wherein the main component comprises up to 2 wt.-% of the at least one of a fillers and a pigment based on the total weight of the main component.

3. The composition as recited in claim 1, wherein the at least one epoxide resin of the main component is present in an amount of from 40 to 90 wt.-% based on the total weight of the main component.

4. The composition as recited in claim 1, wherein the main component comprises the at least one polytetrahydrofuran polyol in an amount of from 2 to 40 wt.-% based on the total weight of the main component.

5. The composition as recited in claim 4, wherein the at least one polytetrahydrofuran polyol has an average molecular mass of from 1000 to 3000 g/mol based on a number average molecular weight.

6. The composition as recited in claim 1, wherein the at least one cycloaliphatic amine of the curing component is present in an amount of from 60 to 100 wt. % based on a total weight of the curing component.

7. The composition as recited in claim 1, wherein the at least one cycloaliphatic amine is isophorone diamine.

8. The composition as recited in claim 1, wherein the at least one epoxide resin comprises epoxide groups and the at least one cycloaliphatic amine comprises N—H groups, the epoxide groups and the N—H groups being present in a molar ratio of from 1 to 0.7 to 1 to 1.4.

9. The composition as recited in claim 1, wherein the composition further comprises at least one plasticizer selected from the group consisting of polyurethane prepolymers having blocked isocyanate groups.

10. The composition as recited in claim 1, wherein the main component further comprises at least one plasticizer consisting of isocyanate prepolymers blocked with at least one of substituted phenols and pyrazoles.

11. The composition as recited in claim 1, wherein the curing component further comprises at least one plasticizer consisting of isocyanate prepolymers blocked with secondary monoamines.

12. A method of using a gelcoat for a surface treatment of a fiber reinforced compound plastics material, the method comprising:
   providing a fiber reinforced compound plastics material;
   providing
   the composition as recited in claim 1;
   manufacturing the gelcoat from the composition; and
   surface treating the fiber reinforced compound plastics material with the gelcoat.

13. A method for manufacturing a surface-treated fiber-reinforced compound plastics material as a construction element, the process comprising:
   providing
   the composition as recited in claim 1;
   mixing the main component and the curing component of the composition so as to obtain a mixture;
   placing the mixture in a component mold;
   allowing the mixture to gel so as to form a gelcoat film;
   applying a woven fabric, a non-woven fabric, or a laid fabric together with a laminating resin to the gelcoat film so as to obtain a laminate; and curing the laminate so as to form the construction element.

14. The method as recited in claim 13, further comprising:
providing the woven fabric, the non-woven fabric, or the laid fabric together with the laminating resin as at least one prepreg; and
applying the at least one prepreg on the gelcoat film so as to obtain the laminate.

15. The method as recited in claim 13, wherein the mixture is placed in the component mold and the mixture allowed to gel so as to form a gelcoat film in a non-covering thickness.

16. A structural element of a fiber-reinforced compound plastics material, wherein a surface of the structural element is coated with the gelcoat layer produced from the composition as recited in claim 1.

17. The structural element as recited in claim 16, wherein the structural element is a rotor blade for a wind turbine.

* * * * *